United States Patent
Polak et al.

(10) Patent No.: US 12,437,520 B2
(45) Date of Patent: Oct. 7, 2025

(54) AUGMENTATION METHOD OF VISUAL TRAINING DATA FOR BEHAVIOR DETECTION MACHINE LEARNING

(71) Applicant: Viisights Solutions Ltd., Tel-Aviv (IL)

(72) Inventors: Simon Polak, Petach Tikva (IL); Shiri Gordon, Tel Aviv (IL); Menashe Rothschild, Tel-Aviv (IL); Asaf Birenzvieg, Hod-HaSharon (IL)

(73) Assignee: Viisights Solutions Ltd., Tel-Aviv (IL)

( * ) Notice: Subject to any disclaimer, the term of this patent is extended or adjusted under 35 U.S.C. 154(b) by 518 days.

(21) Appl. No.: 17/681,786

(22) Filed: Feb. 27, 2022

(65) Prior Publication Data

US 2023/0274536 A1   Aug. 31, 2023

(51) Int. Cl.
    *G06V 10/774* (2022.01)
    *G06T 7/20* (2017.01)
    *G06V 10/764* (2022.01)

(52) U.S. Cl.
    CPC .......... *G06V 10/7747* (2022.01); *G06T 7/20* (2013.01); *G06V 10/764* (2022.01)

(58) Field of Classification Search
    CPC .. G06V 10/7747; G06V 10/764; G06V 10/82; G06V 20/41; G06V 40/23; G06T 7/20; G06T 7/254
    See application file for complete search history.

(56) References Cited

U.S. PATENT DOCUMENTS

| | | | |
|---|---|---|---|
| 2014/0247362 A1* | 9/2014 | Li | G06F 18/22 348/143 |
| 2018/0032845 A1* | 2/2018 | Polak | G06F 18/2411 |
| 2019/0294881 A1* | 9/2019 | Polak | G06V 10/454 |
| 2019/0377974 A1* | 12/2019 | Mathieu | G06N 7/01 |
| 2020/0143171 A1* | 5/2020 | Lee | G06V 20/49 |

* cited by examiner

*Primary Examiner* — Matthew C Bella
*Assistant Examiner* — Andrew B. Jones

(57) ABSTRACT

Disclosed herein are methods and systems for training machine learning (ML) models to classify activity of objects, comprising selecting a set of frames depicting one or more objects from one or more video sequences each comprising a plurality of consecutive frames, associating the object(s) with each pixel included in a bounding box of the object(s) identified in each frame of the set, computing a motion mask for each frame of the set indicating whether each pixel associated with the object(s) in the frame is changed or unchanged compared to a corresponding pixel in a preceding frame, augmenting an image of the object(s) in each frame of a subset of frames of the set to depict only the changed pixels associated with the object(s) by cutting out the unchanged pixels, and training one or more ML models, using the set of frames, to classify one or more activities of the object(s).

20 Claims, 4 Drawing Sheets

AUGMENTATION METHOD OF VISUAL TRAINING DATA FOR BEHAVIOR DETECTION MACHINE LEARNING

FIELD AND BACKGROUND OF THE INVENTION

The present invention, in some embodiments thereof, relates to augmenting visual data used for training Machine Learning (ML) models to identify activities of objects, and, more specifically, but not exclusively, to augmenting visual data used for training ML models to identify activities of objects by cutting out unchanging features of the objects seen in training samples.

Machine learning models(s), for example, neural networks, Support Vector Machines (SVM), decision trees, decision forests, and many others have become a basic building block in a plurality of applications, services, platforms and/or solutions spanning practically every aspect of modern day life.

One of the main contributors in creating high performing and efficient ML is training the ML models with large and versatile training datasets comprising many diverse training samples of the objects that the ML model(s) are trained to identify, classify and/or cluster.

However, training data may be scarce, hard and/or costly to collect in some domains which may present a major limitation for efficient and effective training. One commonly used way to overcome this limitation is increasing the number of the available training samples by augmenting them in one or more manners, for example, transformation, rotation, noise injection, cropping, color spacing and/or the like.

SUMMARY OF THE INVENTION

It is an object of the present invention to provide, methods, systems and software program products for training ML models to classify activity (behavior) of objects, for example, people, animals, vehicles and/or the like using frames of video sequences augmented to remove unchanging features of the objects thus concentrating on the moving/changing features typically expressing the activity. The foregoing and other objectives are achieved by the features of the independent claims. Further implementation forms are apparent from the dependent claims, the description and the figures.

According to a first aspect of the present invention there is provided a computer implemented method of training machine learning (ML) models to classify activity of objects, comprising using one or more processors for:
  Selecting a set of frames depicting one or more objects from one or more video sequences each comprising a plurality of consecutive frames.
  Associating the one or more objects with each of a plurality of pixels included in a bounding box of the one or more objects identified in each of the frames of the set.
  Computing a motion mask for each frame of the set indicating whether each pixel associated with the one or more objects in the respective frame is changed or unchanged compared to a corresponding pixel in a preceding frame of the set.
  Augmenting an image of the one or more objects in each frame of a subset of frames selected from the set of frames to depict only the changed pixels associated with the one or more objects by cutting out the unchanged pixels associated with the one or more objects.
  Training one or more ML models, using the set of frames, to classify one or more activities of the one or more objects.

According to a second aspect of the present invention there is provided a system for training machine learning (ML) models to classify activity of objects, comprising one or more processors adapted to execute a code. The code comprising:
  Code instructions to select a set of frames depicting one or more objects from one or more video sequences each comprising a plurality of consecutive frames.
  Code instructions to associate the one or more objects with each of a plurality of pixels included in a bounding box of the one or more objects identified in each of the frames of the set.
  Code instructions to compute a motion mask for each frame of the set indicating whether each pixel associated with the one or more objects in the respective frame is changed or unchanged compared to a corresponding pixel in a preceding frame of the set.
  Code instructions to augment an image of the one or more objects in each frame of a subset of frames selected from the set of frames to depict only the changed pixels associated with the one or more objects by cutting out the unchanged pixels associated with the one or more objects.
  Code instructions to train one or more ML models, using the set of frames, to classify one or more activities of the one or more objects.

According to a third aspect of the present invention there is provided a computer implemented method of using a trained machine learning (ML) model to classify activity of objects, comprising using one or more processors for:
  Receiving one or more frames depicting one or more objects.
  Applying one or more trained ML models to the one or more frames to classify activity of the one or more objects. The one or more ML models are trained using a plurality of consecutive frames of a video sequence depicting the one or more objects. Wherein the one or more objects are augmented in a subset of frames of the plurality of consecutive frames by cutting out from each of the frames of the subset pixels associated with the one or more objects which are unchanged compared to corresponding pixels in a preceding frame.
  Receiving a classification score for one or more activity labels estimated by the one or more ML models for an activity of the one or more objects.
  Outputting the one or more activity labels in case the classification score exceeds a certain classification confidence threshold.

According to a fourth aspect of the present invention there is provided a system for using a trained machine learning (ML) model to classify activity of objects, comprising one or more processor adapted to execute a code. The code comprising:
  Code instructions to receive one or more frames depicting one or more objects.
  Code instructions to apply one or more trained ML models to the one or more frames to classify activity of the one or more objects. The one or more ML models are trained using a plurality of consecutive frames of a video sequence depicting the one or more objects. Wherein the one or more objects are augmented in a subset of frames of the plurality of consecutive frames by cutting out from each of the frames of the subset pixels associated with the one or more objects which are unchanged compared to corresponding pixels in a preceding frame.

Code instructions to receive a classification score for one or more activity labels estimated by the one or more ML models for an activity of the one or more objects.

Code instructions to output the one or more activity labels in case the classification score exceeds a certain classification confidence threshold.

In a further implementation form of the first, second, third and/or fourth aspects, the one or more activities are members of a group consisting of: an action conducted by the one or more objects, an activity the one or more objects are engaged in, an interaction of the one or more objects with one or more other objects, an event in which the one or more objects participate, and a behavior of the one or more objects.

In a further implementation form of the first and/or second aspects, the bounding box of the one or more objects is identified using one or more visual analysis algorithms.

In a further implementation form of the first and/or second aspects, the bounding box of the one or more objects is defined manually by one or more annotators.

In a further implementation form of the first, second, third and/or fourth aspects, each of the changed pixels is a member of a group comprising: a moved pixel, a displaced pixel, and a transformed pixel.

In a further implementation form of the first, second, third and/or fourth aspects, the changed and unchanged pixels in each frame compared to its preceding frame are identified using one or more motion detection algorithms.

In a further implementation form of the first, second, third and/or fourth aspects, the subset of frames is selected from the set by computing a random value for each frame of the set using one or more random number modules, and including the respective frame in the subset in case the random value computed for the respective frame does not exceed a predefined probability threshold.

In a further implementation form of the first, second, third and/or fourth aspects, cutting out the unchanged pixels comprises blackening each unchanged pixel associated with the one or more objects.

In an optional implementation form of the first, second, third and/or fourth aspects, a plurality of subsets of images are augmented independently for a plurality of objects. Each of the plurality of subsets comprises images of a respective set of frames selected from the plurality of consecutive frames for a respective one of the plurality of objects.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
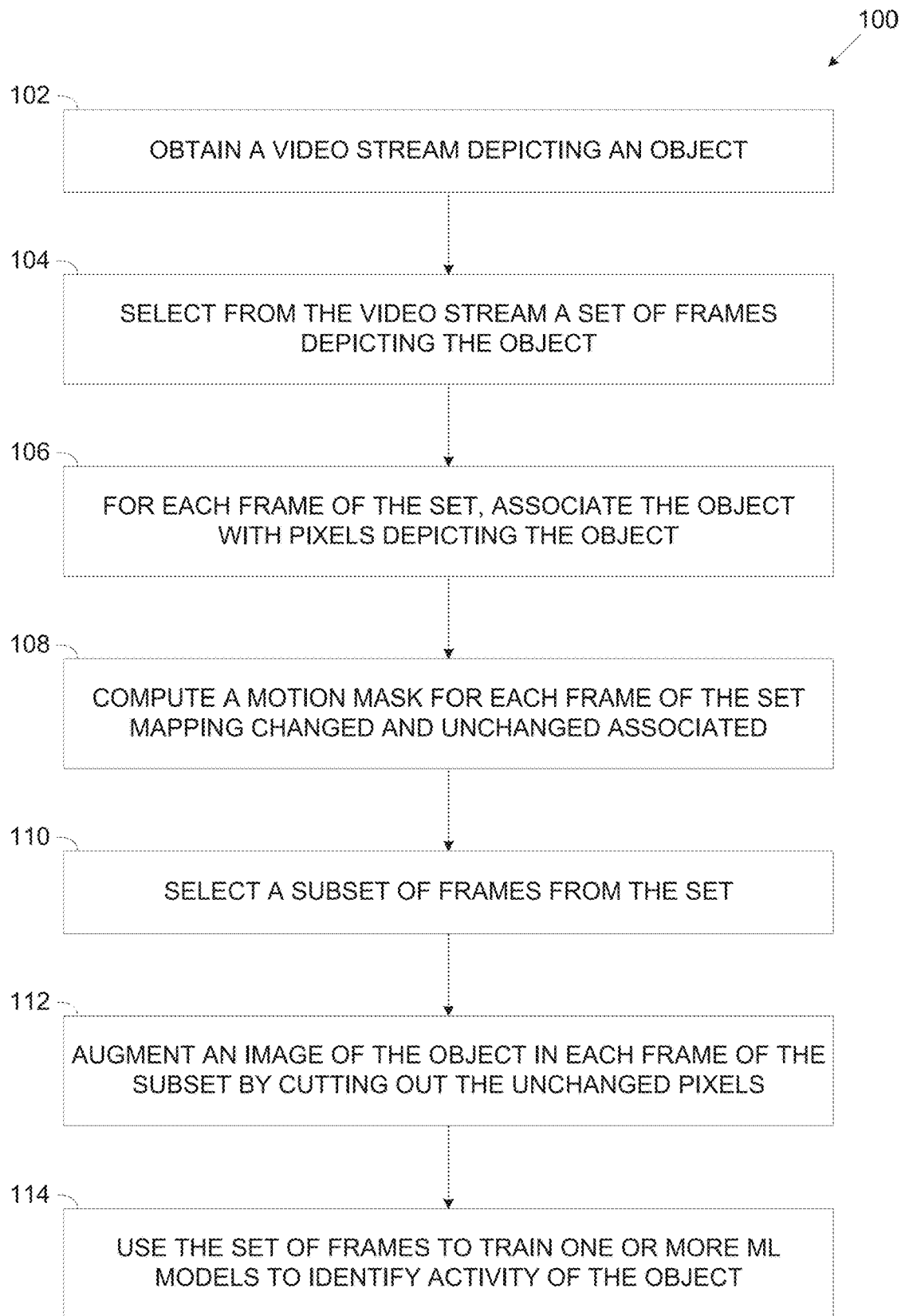
FIG. 1 is a flowchart of an exemplary process of training an ML model to classify activity of objects using video stream frames augmented to cut out unchanging features of the objects depicted in training frames, according to some embodiments of the present invention.

The present invention, in some embodiments thereof, relates to augmenting visual data used for training ML models to identify activities of dynamic objects, and, more specifically, but not exclusively, to augmenting visual data used for training ML models to identify activities of objects using cutoff augmentation by cutting out unchanging features of the objects seen in training samples.

According to some embodiments of the present invention, there are provided methods, systems and computer program products for training one or more ML models to identify and classify activity (behavior) of one or more objects. In particular, the ML models may be trained using frames of a video sequence (stream) in which at least some of the frames are augmented to remove unchanging features of the objects thus emphasizing the changing/moving features which may typically express and/or convey the activity.

The objects may comprise people, animals, vehicles capable of moving, transforming and/or the like but may further comprise static objects which are normally substantially static but may be displaced and/or transformed as result of external force and/or interaction with one or more other objects.

The activity (behavior) of the objects may relate, for example, to actions conducted and/or performed by objects (e.g. raising hand, raising foot, turning head, gazing, etc.), more activities in which objects are involved and/or engaged (e.g. walking, running, eating, playing, etc.), an interaction between objects (e.g. dancing, fighting, etc.), one or more events in which objects participate (e.g. game, show, match, etc.), behavior of objects and/or the like. The type of the activity, its characteristics and/or expression may be defined by the objects involved in the activity.

One or more sets of frames may be selected from one or more video sequences (streams) each comprising a plurality of consecutive frames depicting one or more objects, specifically one or more activities involving one or more objects, for example, an action, an activity, an interaction, an event, behavior and/or the like. Each set may comprise selected frames depicting a respective activity of one of the object(s). The set of frames may therefore include frames of the video sequence which are ordered in time with each of the frames (except the first frame of the set) preceded by a previous frame captured earlier and a succeeding frame (except for the last frame of the set) captured at a later time. While they are ordered in time, the frames in the set are not essentially consecutive frames in the original video sequence.

In each set of frames, each object may be associated with pixels relating to it in each frame of the respective set, i.e., the respective object is associated with each pixel that depicts the respective object and/or part thereof. For example, a bounding box may be created and/or defined for each object and each pixel that is included in the bounding box of the respective object may be associated with the object.

A motion mask may be computed for each frame of the set mapping each of the pixels associated with the object in the respective frame and indicating whether each associated pixel is changed or unchanged compared to a corresponding pixel in the frame preceding the respective frame. The pixels associated with the object which are changed between one or more successive frames of the set may indicate that one or more features of the object have moved, displaced, transformed and/or the like, i.e., such changed pixels may relate to dynamic features of the object.

A respective subset of frames may be then selected from each set of frames such that the subset may comprise frames relating to a respective activity of an object. the frames of the subset may be augmented, for example, by cutting out the unchanged pixels of each frame of the subset and blackening them thus leaving only the changed pixels.

The set(s) of frames which may be typically labeled with an activity label may be then used as a training dataset to train one or more ML models, for example, a neural network, an SVM, a decision tree, a decision forest, a boosting machine learning algorithm, a Hidden Markov chain, a conditional random field, a belief network, a belief propagation (BP) algorithm and/or the like to identify and classify activity of one or more of the objects.

The trained ML model(s) may be later applied to one or more frames (pictures, images) to identify and classify activity of one or more objects seen in the frames.

Training ML models to classify objects' activity and behavior using augmented frames of a video sequence, specifically cutoff augmented frames may present significant advantages and benefits compared to existing training methods and systems.

First, since the video sequence may detail at least part of the flow of the activity using frames extracted from the video sequence may significantly increase classification performance of the ML model(s), for example, accuracy, reliability, consistency and/or the like compared to the existing methods which may train the ML model(s) using unrelated frames and/or images captured sporadically and independently. Trained with frames showing the flow of the activity or at least part thereof, the ML model(s) may learn timing and/or order characteristics, features and/or attributes of the activity thus significantly improving its performance.

Moreover, augmenting some of the frames used to train the ML model(s) by cutting out the pixels which are unchanged between succeeding frames while leaving in the changed pixels may further increase the classification performance of the ML model(s). This is because the changed pixels may typically relate to changing/moving features of the object which may naturally express the activity of the object whereas the unchanged pixels may relate to non-dynamic (static) features of the object which may naturally be less indicative and/or expressive of the activity. For example, assuming a certain object, for example, a person depicted in the frames while throwing an object. In such case the changing/moving features expressing the throwing activity (behavior) may include, for example, the person's hands and shoulders while other features such as, for example, head, waist, and/or abdomen, may be significantly static. In another example, assuming a certain object, for example, a person depicted in the frames while eating, the dynamic features expressing the eating activity may include, for example, one or both hands, jaws, neck and/or upper torso of the eating person, while other features such as, for example, legs, heaps, and/or abdomen may be significantly static. The ML model(s) trained with the augmented frames may therefore focus on learning the changing/moving features thus improving their detection and classification of the activity expressed through these features.

Furthermore, augmenting only part of the frames of the set used to train the ML model(s) may ensure that the ML model(s) maintain a full context of the object and its features. Since not all of the frames are augmented, the ML model(s) may identify the non-dynamic features of the object in at least some of the training frames and may learn to discern between the dynamic and non-dynamic features of the object thus further concentrating and focusing on the dynamic features to learn the activity of the object expressed primarily via the dynamic features.

In addition, augmenting the frames, based on random condition, so that when a frame is presented to the training algorithm its visual appearance differs, increases the number of training samples in the training dataset which may increase performance of ML model(s) trained with the increased size dataset and may further prevent overfitting of the ML model(s) as a may happen when training it using a limited dataset comprising a smaller number of training samples (frames).

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process of training an ML model to classify activity of objects using video stream frames augmented to cut out unchanging features of the objects depicted in training frames, according to some embodiments of the present invention.

An exemplary process 100 may be executed for augmenting at least some frames of a video sequence (stream) depicting one or more objects, and using the augmented frames typically together with some non-augmented frames of the video stream for training one or more ML models to classify activity (behavior) of the object(s).

The objects may typically include objects capable of moving, transforming their shape and/or the like, for example, one or more persons (interchangeably designated people), one or more animals (e.g. wild life animal, livestock, pet, etc.), one or more vehicles (e.g. ground vehicle, aerial vehicle, naval vehicle, etc.) and/or the like.

The activity (behavior) of the objects may relate to one or more activities in which one or more of the objects are involved and/or engaged, one or more actions conducted and/or performed by one or more of the objects, one or more events in which the one or more of the objects participate, an interaction of one or more of the objects with one or more other objects, a behavior of one or more of the objects and/or the like.

The type of each activity (behavior), its characteristics and/or expression may be naturally defined by the objects involved in the activity.

For example, assuming the object is a person, the activities may include, for example, one or more actions and/or gestures conducted by one or more persons (people), for example, raising a hand, raising a foot, moving head, kicking, punching, throwing, and/or the like. In another example, the activities may include one or more activities in which one or more persons may be engaged, for example, walking, running, jumping, eating, drinking, crawling, dancing, throwing an object, watching, waving, and/or the like. The activities may further include interaction of one or more people with one or more other objects, for example, working at a computer terminal, working with tool(s) and/or equipment, riding a bike, playing with one or more other people, playing with one or more objects (e.g. ball, guitar, jump rope, dog, etc.), getting into a vehicle, getting out of a vehicle, quarrelling and/or fighting one or more other people, and/or the like. In another example, the activities may include one or more events in which one or more people participate, for example, watching a show, playing in a match, participating in a parade and/or a demonstration, and/or the like. In another example, the activities may include a behavior of one or more persons.

In another example, assuming the object is an animal, the activity may include, for example, one or more actions and/or gestures conducted by one or more animals, for example, raising a foot, moving head, biting, and/or the like. In another example, the activities may include one or more activities in which one or more animals may be engaged, for example, walking, running, jumping, eating, drinking, crawling, swimming, and/or the like. The activities may further include interaction of one or more animals with one or more other objects and/or animals, for example, playing with one or more objects, engaging (fond or hostile) with one or more other animals and/or people, and/or the like.

In another example, assuming the object is a vehicle, the activity may include, for example, one or more actions conducted by one or more vehicles, for example, accelerating, breaking, turning, parking, and/or the like.

However, while the objects may typically include dynamic objects, the objects may further include one or more objects which are typically and normally static but may move and/or transform as result of external force and/or interaction with one or more other objects. For example, the objects may include a door, a window, a piece of furniture (e.g. chair, table, etc.), and/or the like which may break, shatter and/or otherwise change its appearance as result of an external force, for example, a hit (blow) by another object, a blast of wind and/or the like. In another example, the objects may include one or more plants (e.g. tree, bush, etc.) which may be normally static but may move, for example, bend, sway, swing and/or waver due to wind, rain and/or the like.

A set of frames may be selected from the plurality of frames of the video sequence for each object depicted and detected and/or annotated in the video sequence such that the selected set may comprise frames depicting the respective object at least partially. A subset of frames selected from the set may be augmented to cutoff non-dynamic features in an image (representation) of the respective object in the frame, i.e., features of the respective object which do not move between at least some frames of the set such that the subset of frames may show only dynamic features of the respective object which move (change location) between at least some of the frames.

In case multiple objects are detected in the video sequence, a plurality of sets of frames may be selected each for a respective one of the plurality of objects such that each set may comprise frames depicting the respective object. Moreover, for each of the plurality of objects, a respective subset of frames may be selected from the respective set and the frames of the respective subset may be augmented by cutting out at least one of the non-dynamic features of the respective object.

The video sequence, in particular the set of frames comprising the subset of augmented frames may be used as training samples for training one or more of the ML models, for example, a neural network, an SVM, a decision tree, a decision forest, a boosting machine learning algorithm, a Hidden Markov chain, a conditional random field, a belief network, a belief propagation (BP) algorithm and/or the like.

The ML model(s) trained using the augmented frames, in which the non-dynamic features of the object(s) are not seen, may focus and concentrate on learning the dynamic features of the object(s) while not distracted by its non-dynamic features. Since the ML model(s) configured and trained to identify and classify activity (behavior) which is typically expressed by the dynamic features of the object(s), the performance of the ML model(s) may be significantly increased, specifically efficiency, accuracy, consistency, reliability and/or robustness of the human behavior classification.

Figure 2:
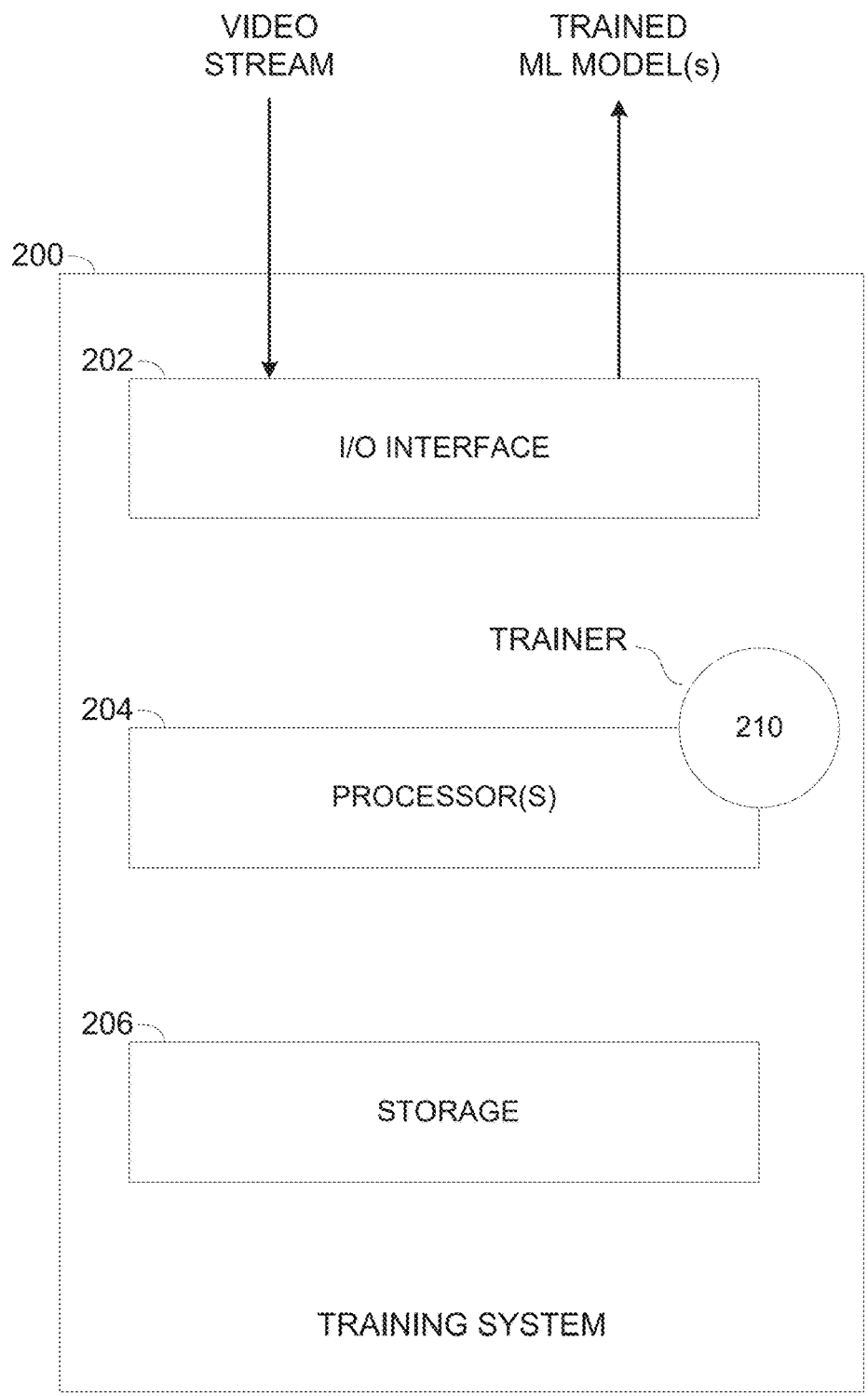
FIG. 2 is a schematic illustration of an exemplary system for training an ML model to classify activity of objects using video stream frames augmented to cut out unchanging features of the objects depicted in training frames, according to some embodiments of the present invention.

Reference is also made to FIG. 2, which is a schematic illustration of an exemplary system for training an ML model to classify activity of objects using video stream frames augmented to cut out unchanging features of the objects depicted in training frames, according to some embodiments of the present invention.

An exemplary training system 200, for example, a computer, a server, a computing node, a cluster of computing nodes and/or the like may include an Input/Output (I/O) interface 202, a processor(s) 204 for executing a process such as the process 100 and a storage 206 for storing code (program store) and/or data.

The I/O interface 202 may include one or more network interfaces for connecting to one or more wired and/or wireless networks, for example, a Local Area Network (LAN), a Wireless LAN (WLAN), a Wide Area Network (WAN), a Municipal Area Network (MAN), a cellular network, the internet and/or the like. The I/O interface 202 may further include one or more local interfaces, for example, a Universal Serial Bus (USB), a serial port, a Radio Frequency (RF) interface and/or the like for connecting to one or more local resources, for example, an attachable storage device, another computing device and/or the like.

The processor(s) 204, homogenous or heterogeneous, may include one or more processing nodes arranged for parallel processing, as clusters and/or as one or more multi core processor(s). The storage 206 used for storing data and/or program code may include one or more non-transitory memory devices, either persistent non-volatile devices, for example, a hard drive, a solid state drive (SSD), a magnetic disk, a Flash array and/or the like and/or volatile devices, for example, a Random Access Memory (RAM) device, a cache memory and/or the like. The storage 206 may further comprise one or more local and/or remote network storage resources, for example, a storage server, a Network Attached Storage (NAS), a network drive, and/or the like accessible via one or more networks through the I/O interface 202.

Through the I/O interface 202, the training system 200 may obtain, for example, receive, fetch and/or retrieve one or more video streams each comprising a plurality of consecutive frames depicting one or more of the objects which are engaged and/or involved in one or more actions, activities and/or events. For example, the training system 200 may receive one or more of the video streams from one or more remote network resources via one or more networks to which the I/O interface 202 is connected. In another example, the training system 200 may retrieve one or more of the video streams from one or more attachable storage devices (e.g. memory stick) attached to the I/O interface 202. Optionally, the training system 200 may fetch one or more of the video streams stored in one or more of its local storage resources, for example, the storage 206.

The processor(s) 204 may execute one or more software modules, for example, a process, a script, an application, an agent, a utility, a tool, an Operating System (OS) and/or the like each comprising a plurality of program instructions stored in a non-transitory medium such as the storage 206 and executed by one or more processors such as the processor(s) 204. Optionally, the processor(s) 204 may further, integrate, utilize and/or facilitate one or more hardware elements (modules) integrated and/or utilized in the edge node 202, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU), an Artificial Intelligence (AI) accelerator and/or the like.

The processor(s) 204 may therefore execute one or more functional modules implemented using one or more software modules, one or more of the hardware modules and/or combination thereof. For example, the processor(s) 204 may execute a trainer 210 functional module for executing the process 100 to train one or more of the ML model(s) to learn, identify and classify activity (behavior) of one or more objects, specifically dynamically moving objects and/or transforming objects.

Optionally, the training system 200 and/or the trainer 210 are provided, utilized and/or implemented using one or more cloud computing services, for example, Infrastructure as a Service (IaaS), Platform as a Service (PaaS), Software as a Service (SaaS) and/or the like provided by one or more cloud infrastructures and/or services such as, for example, Amazon Web Service (AWS), Google Cloud, Microsoft Azure and/or the like.

For brevity, the process 100 is described for training a single ML model to identify and classify activities and behavior of a single object using frames of a single video stream in which the image of the single object is augmented in at least some frames of a single video stream depicting the object. This, however, should not be construed as limiting since the process 100 may be easily and intuitively expanded, as may be apparent to a person skilled in the art, to train a plurality of ML models to identify and classify activities and behavior of a plurality of objects using frames of a plurality of video streams in which the image of one or more of the plurality of objects is augmented in at least some frames of the video stream depicting the respective object. In fact, in order to create efficient, reliable, accurate and/or robust the ML model(s), the ML model(s) may be trained with augmented frames selected from a plurality of different video streams.

As shown at 102, the process 100 starts with the trainer 210 receiving, retrieving, fetching and/or otherwise obtaining a video sequence (stream) comprising a plurality of consecutive frames where at least some of the plurality of frames depict a certain object.

As described herein before, the object depicted in the video sequence may typically be a dynamic and/or transforming object, for example, a person, an animal, a vehicle, and/or the like but may optionally be a static object which transforms its shape due to external force(s) (e.g. wind, rain, etc.), due to interaction with one or more other objects and/or the like.

The trainer 210 may obtain the video sequence from one or more source. For example, the trainer 210 may receive the video sequence from one or more remote network resources via one or more networks to which the I/O interface 202 is connected. In another example, the trainer 210 may fetch the video sequence from one or more local storage resources of the training system 200, for example, the storage 206. In another example, the trainer 210 may retrieve the video sequence from one or more attachable storage resources attached to the I/O interface 202.

As shown at 104, the trainer 210 may select a set of frames from the plurality of frames of the video sequence. In particular, the selected set may comprise frames in which the (certain) object is detected. Optionally, the selected set may comprise one or more frames in which the (certain) object is annotated.

The number of frames selected by the trainer 210 to the set may be predefined and/or dynamically determined by the trainer 210 based on availability of frames in the video sequence and their relevancy, i.e., whether or not they depict (show) the object and optionally in what quality, distance, completeness and/or the like.

It should be noted that while it may be desired to select as many relevant frames as possible, the selection may be also defined by the computing resources (e.g. processing resources, storage resources, time, etc.) available for training the ML model(s) or ML algorithm parameters. Such considerations however are beyond the scope of this disclosure.

The trainer 210 may apply and/or use one or more visual analysis methods, tools, and/or algorithms as known in the art (collectively designated algorithms) to detect the object in the frames of the video sequence, for example, computer vision, image processing an/do the like. Optionally, one or more of the objects may be annotated in one or more of the frames of the video sequence prior to training the ML models of the behavior recognition algorithm. The object(s) may be annotated manually (by one or more annotator), automatically (using one or more object detection systems or methods) and/or a combination thereof.

The frames selected by the trainer 210 to the set may naturally be time sequenced since each frame of the video sequence may succeed one or more previous (earlier) frames of the video sequence. The set may comprise one or more fames which immediately succeed their predecessor frames in the video sequence, i.e., frames which come immediately one after the other. However, the set may include one or more frames which do not immediately succeed, in the video sequence, their preceding frames in the set. For example, assuming a certain video sequence comprises 10 frames all depicting the object. In such case, the set of frames selected from the certain video sequence may comprise immediately succeeding frames, for example, frames [2, 3, 4, 5, 6, 7, 8].

However, the set of frames selected from the certain video sequence may comprise frames which do not immediately succeed each other in the certain video sequence, for example, frames [1, 3, 5, 7, 9], frames [1, 2, 4, 7, 10], frames [2, 3, 4, 5, 8, 10] and/or the like.

As shown at 106, for each frame of the selected set of frames, the trainer 210 may associate the (certain) object with each pixel of the frame which relates to the object, specifically to an image of the object in the frame, i.e., each pixel depicting the object. This is since while each frame may include a plurality of pixels, not all of the pixels of one or more of the frames may relate to the image of the object. For example, one or more of the pixels of one or more of the frames of the set may relate to one or more background objects seen in the respective frame. In another example, one or more of the pixels of one or more of the frames of the set may relate to one or more foreground (blocking) objects seen in the respective frame.

The trainer 210 may apply and/or use one or more visual algorithms as known in the art to associate the object with each pixel relating (depicting) to the image of the certain image in each of the frames of the set. For example, the trainer 210 may use one or more visual analysis algorithms configured to detect objects in frames and create a bounding box for each detected object. Using one or more such visual analysis algorithms, the trainer 210 may therefore create a bounding box for the object in each of the frames of the set.

Optionally, the bounding box of the object may be manually annotated by one or more annotators (users) in one or more of the frames of the set.

For each frame of the set, the trainer 210 may therefore associate the object with each pixel of the frame that is included (i.e., within) the bounding box of the object while pixels which are not included, i.e., outside the bounding box of the object may not be correlated with the object.

As shown at 108, the trainer 210 may compute a motion mask for each frame of the set. The motion mask may map the pixels of the respective frame and indicate whether each pixel of the respective frame is changed or unchanged compared to a corresponding pixel in the frame preceding the respective frame in the set. In particular, the motion mask may indicate which pixel associated with the (certain) object in the respective frame is changed or unchanged compared to its corresponding pixel in the frame preceding the respective frame in the set.

Corresponding pixels as used herein refer to pixels which are located at the same location on a grid mapping the frames. For example, assuming the frames have a certain resolution defining a grid of pixels, corresponding pixels refer to pixels of a group of two or more frames that are located at the same place (e.g., X, Y coordinates) on the grid in all of the frames of the group.

The pixels associated with the object which are changed between one or more successive frames of the set may indicate that one or more features of the object have moved, displaced, transformed and/or the like, i.e., such changed pixels may relate to dynamic features of the object.

For example, one or more of the pixels associated with the object may be moved pixels that are changed due to a movement of one or more of the dynamic features of the object, for example, hand, leg, head, shoulder, jaw, eye, tongue, claw, beak, wheel, door, and/or the like between frames of the set. For example, assuming the object is a person, one or more moved pixels of a certain frame of the set may change due to a head turn of the object between successive frames of the set. In another example, assuming the object is a person watching a sports match, one or more moved pixels of a cretin frame of the set may change due to an eye movement of the object between successive frames of the set.

In another example, one or more of the pixels associated with the object may be displaced pixels that are changed due to displacement (i.e., location change) of the object in the respective frame compared to its location in the preceding frame(s) of the set. For example, assuming the object is a dynamic object, for example, a person, an animal, a vehicle and/or the like which is moving, the image of the dynamic object may be located in different regions of successive frames of the set thus the pixels associated with the dynamic object may change between the successive frames.

In another example, one or more of the pixels associated with the object may be transformed pixels changed due to transformation of the object in the respective frame compared to its appearance in the preceding frame(s) of the set. For example, one or more transformed pixels of a certain frame of the set may change due the object and/or part thereof breaking, shattering, folding, crumpling, color switching, and/or the like. For example, assuming the object is a door, one or more transformed pixels of a cretin frame of the set may change due to the door breaking as result of a person crushing into it. In another example, assuming the object is a carton box, one or more transformed pixels of a certain frame of the set may change due the carton box crumpling because it gets wet in rain.

In contrast, pixels associated with the object which are unchanged between successive frames of the set may relate to non-dynamic features of the object which do not move, displace, transform and/or the like.

The trainer 210 may apply one or more methods and/or structures to compute and construct the motion mask to map the changed and unchanged pixels associated with the object. For example, the motion mask may be constructed as an array, a matrix and/or the like comprising a plurality data items each mapping a corresponding pixel of the respective frame. Each of the data items may be set to 1 or 0 to indicate whether the corresponding pixel is changed or unchanged respectively.

The trainer 210 may apply and/or use one or more visual analysis methods, tools, and/or algorithms as known in the art to determine whether each pixel associated with the object in each frame of the set is changed or not compared to its preceding frame of the set. For example, the trainer 210 may use one or more motion detection algorithms as known in the art configured to detect motion and indicate the pixels depicting the motion.

In another example, the trainer 210 may compute a value of one or more pixel parameters of one or more pixels associated with the object in one or more of the frames of the set, for example, a brightness, a contrast, a color component and/or the like. The trainer 210 may compare between the values of one or more of the pixel parameters of corresponding pixels in successive frames and apply one or more predefined and/or learned thresholds to determine whether the pixels are changed or unchanged. In such case, if the difference between the values of one or more of the pixel parameters of corresponding pixels exceeds the threshold(s), the trainer 210 may determine that the pixel changed. In case the difference between the value(s) of the pixel parameters of the corresponding pixels does not exceed the threshold(s), the trainer 210 may determine that the pixel is unchanged.

As shown at 110, the trainer 210 may select a subset of frames from the set of frames initially selected for the (certain) object.

The trainer 210 may apply one or more methods, techniques and/or algorithms for selecting how many frames to include in the subset and which of the frames of the set to select.

For example, the trainer 210 may apply one or more random selection processes to select the frames of the subset for the object. For example, the trainer 210 may compute a random value for each frame of the set using one or more random number modules, for example, a random number generator, a Pseudo Random Number Generator (PRNG) and/or the like. The trainer may then select each frame for which the computed random number does not exceed a predefined probability threshold, i.e., the computed random number is below the predefined probability. Assuming the set comprises a large number of frames, the probability threshold may therefore define the number, or more accurately the percentage of frames of the set that are selected to the subset of frames associated with the object. For example, a probability threshold of 0.25 may define selecting 25% of the frames of the set to the subset, a probability threshold of 0.4 may define selecting 40% of the frames of the set to the subset and so on. The probability threshold may be defined according to one or more requirements, constraints and/or parameters defined for training the ML model(s).

As shown at 112, the trainer 210 may augment the image of the (certain) object in each frame of the subset.

The trainer 210 may apply one or more augmentations to the frames of the subset as known in the art, for example, displacement, transformation, rotation, zoom-in/zoom-out, distortion, noise injection and/or the like.

In particular, the trainer 210 may apply cutoff augmentation to the frames of the subset by cutting out one or more features of the image of the object while leaving other feature(s) of the object in its image. Specifically, for each frame of the subset, the trainer 210 may cut out the unchanged pixels mapped in the motion mask of the respective frame while leaving as is the changed pixels. Cutoff augmentation as used herein comprise cutting out all unchanged pixel associated with the at least one object in each frame of the subset by blackening the associated unchanged pixels, i.e., painting the associated unchanged pixels in black.

As described herein before, the process 100 may be extended for a plurality of objects which may be found in the video sequence. In such case, the trainer 210 may apply steps 104 through 112 for each object in at least some of the frames of the video sequence. Moreover, the process 100 may be extended for a plurality of activities of the same object depicted in the video sequence.

Specifically, the trainer 210 may select a plurality of sets of frames from the plurality of consecutive frames of the video sequence where each of the sets may comprise frames depicting a respective one of the plurality of objects. For each set, the trainer 210 may compute a motion mask for each frame of the respective set to indicate whether each pixel of the respective frame is changed or unchanged compared to the corresponding pixel in a preceding frame of the respective set. The trainer 210 may further select a plurality of subsets of frames each subset selected from a respective one of the plurality of sets. The trainer may then augment the image of the respective object in each frame of each subset by cutting out the unchanged pixels while leaving as is the changed pixels thus creating a plurality of cutout subsets each for a respective one of the plurality of objects. In particular, the trainer 210 may augment the frames of each subset independently such that in each cutout subset only the image of the respective object is processed (cutout) in the frames of the respective subset while other objects which may be seen in the frame(s) of the respective subset may be completely removed and/or left as is.

In a similar manner, the trainer 210 may select a plurality of sets of frames each for a respective one of a plurality of activities relating to a certain object, i.e., a plurality of activities involving the same object.

The trainer 210 may apply the following exemplary computation for selecting a subset of frames in which the image of one or more objects is augmented by cutting out the unchanged pixels associated with each respective object. Assuming a set comprises a plurality of frames (0, . . . , I) depicting a plurality of objects (1, . . . , O). For each frame i of the set, the trainer 210 computed a respective motion mask M(i). For each frame i, the trainer 210 may further apply the bounding box of each object o of the plurality of objects O. For each object o, the trainer 210 may compute a random value r for the frame i. In case the random value r is smaller than (does not exceed) a predefined threshold P, i.e., r<P, the trainer 210 may augment the frame I for the object o, specifically cut out, for example, blacken, i.e., set to 0) each pixel [x, y] (where x, y are the coordinates of the pixel in the frame) associated with the object o that is indicated in the motion mask M(i) as unchanged, for example, set the M(i)[x, y]=0.

Reference is now made to FIG. 3A, FIG. 3B, FIG. 3C and FIG. 3D, which are schematic illustrations of selecting an object in a frame, creating a motion mask for the frame and augmenting an image of the object in the frame by cutting out non-dynamic features of the object, according to some embodiments of the present invention.

Figure 3A:
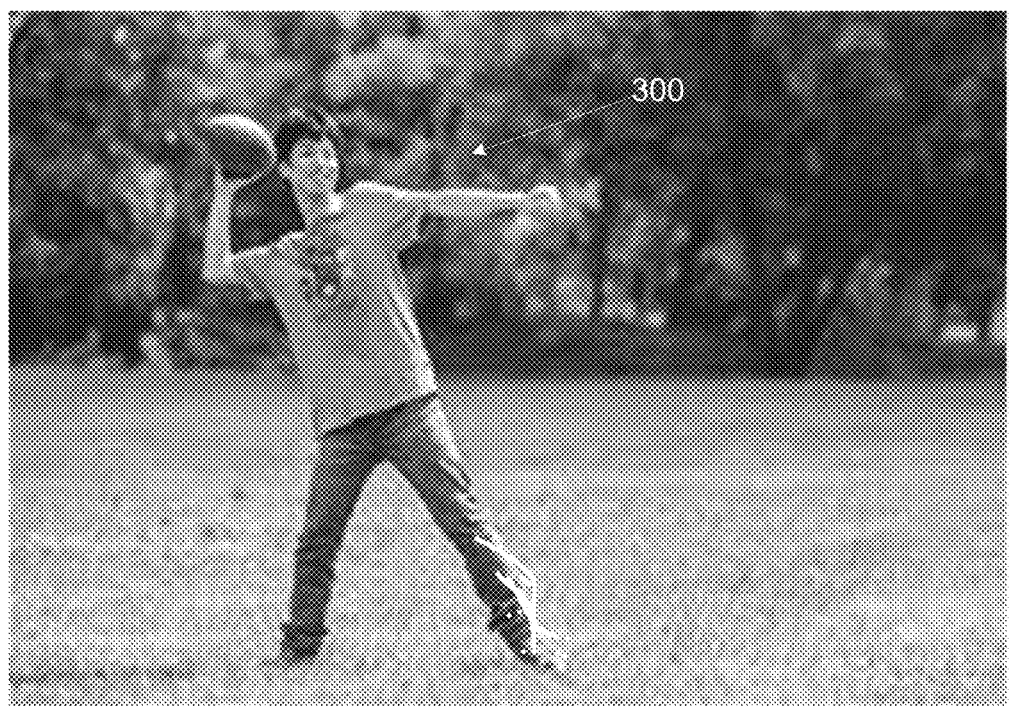
FIG. 3A, FIG. 3B, FIG. 3C and FIG. 3D are schematic illustrations of selecting an object in a frame, creating a motion mask for the frame and augmenting an image of the object in the frame by cutting out unchanging features of the object, according to some embodiments of the present invention.

As seen in FIG. 3A, a trainer such as the trainer 210 may obtain an image of an object as described in step 10 of the process 100, for example, an image of a person 300 throwing a ball.

Figure 3B:
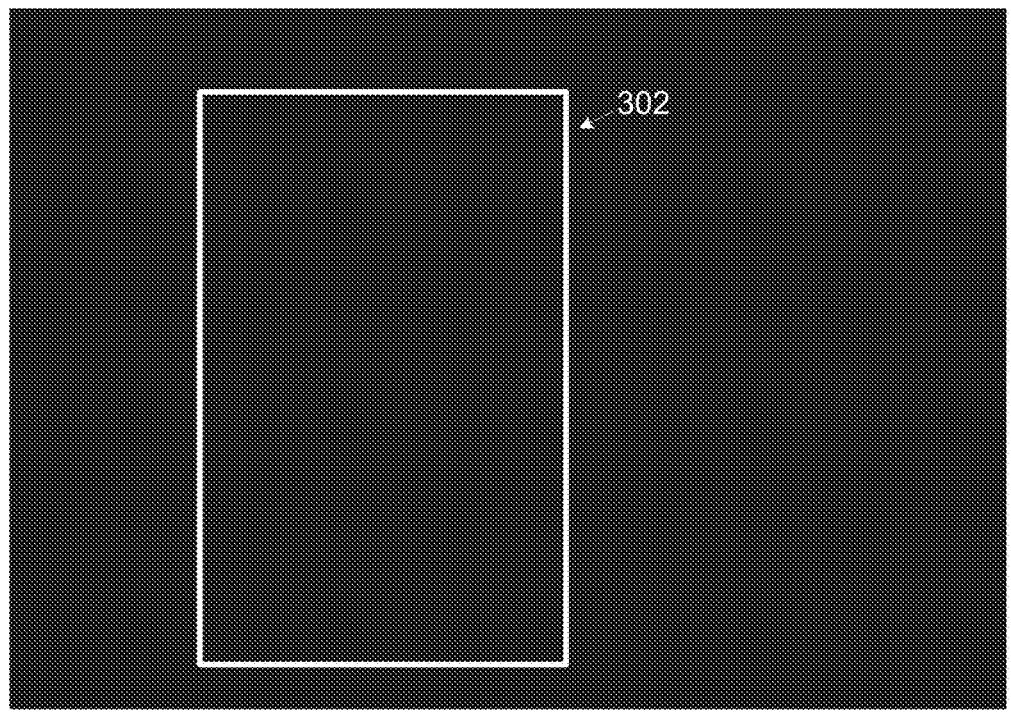

As seen in FIG. 3B, assuming the image is selected to the set of frames created for the person 300, the trainer 210 may create, define and/or infer a bounding box for the person 300 as described in step 106 of the process 100 in order to associate the person 300 with the pixels in the frame that relate to the person 300, i.e., pixels depicting the person 300, its features and/or part thereof.

Figure 3C:
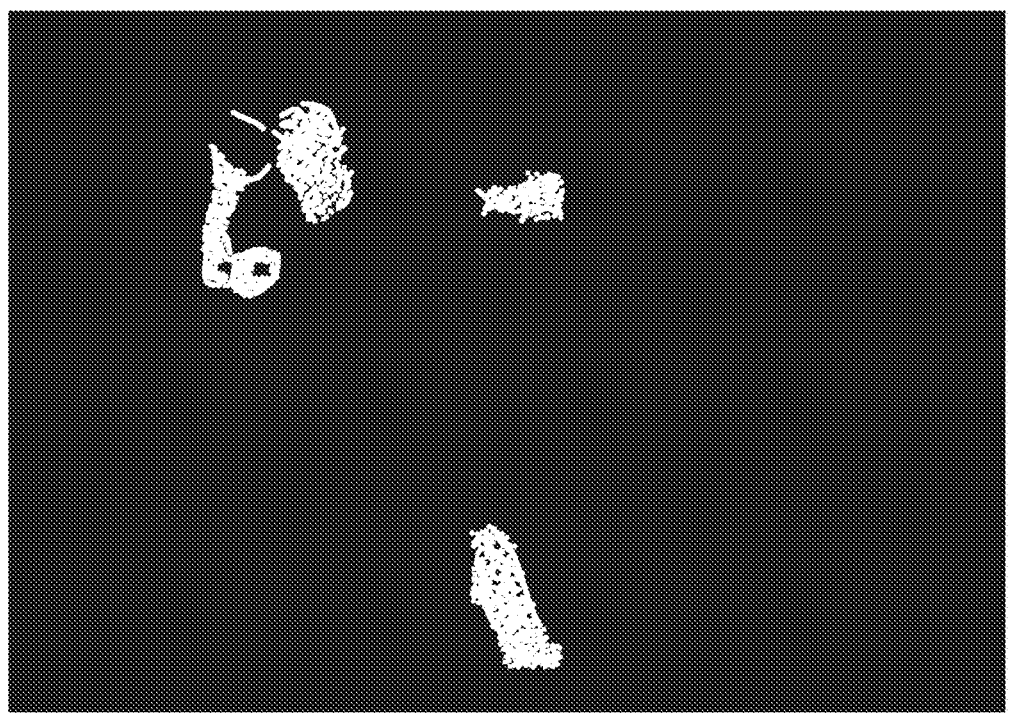

As seen in FIG. 3C, the trainer 210 may compute a motion mask for the frame as described in step 108 of the process 100 to map changed and unchanged pixels which are associated with the person 300, i.e., indicate whether each pixel associated with the person 300 is changed or unchanged compared to its corresponding pixel in a preceding frame. For example, since the person 300 is throwing the ball, the right and left hands of the person 300, the head of the person and his left leg may move while other features of the user 300, for example, his right leg, his chest, his waist to name a few may be substantially static and not moving. In such case, the motion map may indicate that pixels mapping the right hand, the left hand, the head and the left leg of the person 300 are changed (annotated white) while the rest of the pixels associated with the person 300 are unchanged (annotated black).

Figure 3D:
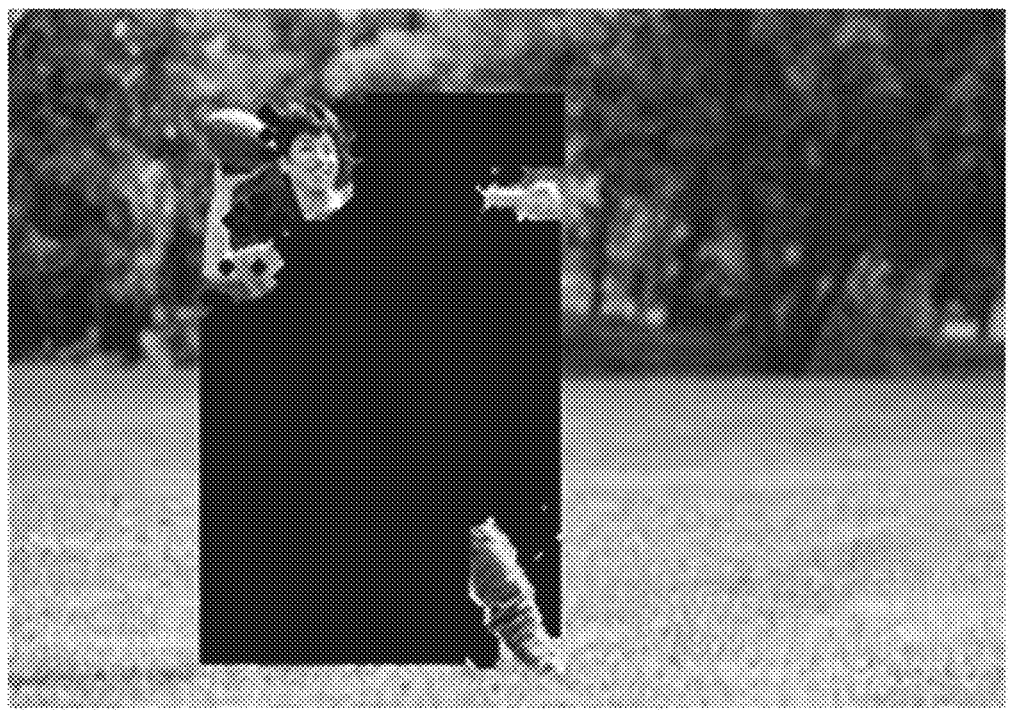

As seen in FIG. 3D, assuming the image is included in the subset of frames selected for augmentation for the person 300, the trainer 210 may augment the frame by cutting out, for example, blackening the unchanged pixels as described in step 112 of the process 100 thus leaving only the changed pixels which as described herein before may relate to the dynamic features of the person 300 which move between successive frames.

Reference is made once again to FIG. 1.

As shown at 114, the trainer 210 may use the set of frames comprising the subset of augmented frames in which the unchanged pixels of the object are cut out, as a training dataset samples for training one or more of the ML models to classify one or more activities of the object. Optionally, the ML model(s) may be further trained with none of the frames of the set being augmented.

Typically, each of the training samples, i.e., objects in the frames of the set may be labeled with a label (classification label) classifying the activity (behavior) performed by the object and/or to the object in the frame, for example, raising a hand, throwing an object, running, bending, swimming, eating, chewing, fighting, breaking and/or the like.

The ML model(s) trained with the set of frames, specifically the labeled frames may adapt, adjust, evolve and/or otherwise learn as known in the art to classify the activity of the object, for example, adjust its architecture (layers, nodes, etc.), adjust its weights and/or the like.

Optionally, in addition to the set of frames comprising the subset of augmented frames, the trainer 210 may use additional frames of the video sequence not included in the set and optionally the entire video sequence for training the ML model(s).

Moreover, in case the trainer 210 created a plurality of sets and respective cutout subsets for a plurality of objects and/or a plurality of activities relating to the same of one or more objects, the trainer 210 train one or more of the ML model(s) using multiple sets of frames each relating to one of the multitude of objects and comprising a respective subset of augmented frames in which the image of the respective object(s) is augmented (cutout). The ML model(s) may therefor further learn to classify a plurality of activities optionally involving a plurality of objects.

One or more systems, services, platforms and/or applications (collectively designated classification systems) may use the trained ML model(s) to identify and classify one or more activities of one or more objects, in particular, activities of objects which were presented in the training samples. Specifically, the trained ML model(s) may be applied to one or more frames depicting one or more objects, in particular object(s) involved in one or more activities.

The trained ML model(s) may process the frame(s) and output one or more classification labels each indicative of one or more activities of the detected object(s), i.e., activities which the object(s) perform, involved in, participate and/or the like. Together with each classification label, the trained ML model(s) may typically output a confidence score indicating confidence of the classification of the activities(s), for example, accuracy, reliability and/or the like.

The classification system(s) may then output classification of the activity(s) of the object(s) based on the classification label(s) received from the trained ML model(s) optionally also based on the confidence score. For example, in case the confidence score of a certain classification label exceeds a certain confidence threshold, the classification system(s) may determine that the classification of the ML model(s) is sufficiently reliable and may output the certain classification label(s). However, in case the confidence score of a certain classification label does not exceed the confidence threshold, the classification system(s) may determine that the classification of the ML model(s) may be unreliable and may not output the certain classification label(s)

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms Machine Learning (ML) model and training samples augmentation is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of training machine learning (ML) models to classify activity of objects, comprising:
    using at least one processor for:
        selecting a set of frames depicting at least one object from at least one video sequence comprising a plurality of consecutive frames;
        associating the at least one object with each of a plurality of pixels included in a bounding box of the at least one object identified in each of the frames of the set;
        computing a motion mask for each frame of the set indicating whether each pixel associated with the at least one object in a respective bounding box in a respective frame is changed or unchanged compared to a corresponding pixel in a preceding frame of the set;
        augmenting an image of the at least one object in each frame of a subset of frames selected from the set of frames to depict only the changed pixels within said respective bounding box and associated with the at least one object by cutting out the unchanged pixels associated with the at least one object; and
        training at least one ML model, using the set of frames, to classify at least one activity of the at least one object based on identified moving portions of said at least one object according to said depicted changed pixels;
        wherein the motion mask computation and pixel augmentation are performed to improve ML model training accuracy by emphasizing temporally changing object features.

2. The computer implemented method of claim 1, wherein the at least one activity is a member of a group consisting of: an action conducted by the at least one object, an activity the at least one object is engaged in, an interaction of the at least one object with at least one another object, an event in which the at least one object participates, and a behavior of the at least one object.

3. The computer implemented method of claim 1, wherein the bounding box of the at least one object is identified using at least one visual analysis algorithm.

4. The computer implemented method of claim 1, wherein the bounding box of the at least one object is defined manually by at least one annotator.

5. The computer implemented method of claim 1, wherein each of the changed pixels is a member of a group consisting of: a moved pixel, a displaced pixel, and a transformed pixel.

6. The computer implemented method of claim 1, wherein the changed and unchanged pixels in each frame compared to its preceding frame are identified using at least one motion detection algorithm.

7. The computer implemented method of claim 1, wherein the subset of frames is selected from the set by computing a random value for each frame of the set using at least one random number module, and including the respective frame in the subset in case the random value computed for the respective frame does not exceed a predefined probability threshold.

8. The computer implemented method of claim 1, wherein cutting out the unchanged pixels comprises blackening each unchanged pixel associated with the at least one object.

9. The computer implemented method of claim 1, further comprising augmenting independently a plurality of subsets of images for a plurality of objects, each of the plurality of subsets comprises images of a respective set of frames selected from the plurality of consecutive frames for a respective one of the plurality of objects.

10. A system for training machine learning (ML) models to classify activity of objects, comprising:
    a non-transitory computer readable medium storing executable code;
    at least one processor adapted to execute said code, the code comprising:
        code instructions to select a set of frames depicting at least one object from at least one video sequence comprising a plurality of consecutive frames;
        code instructions to associate the at least one object with each of a plurality of pixels included in a bounding box of the at least one object identified in each of the frames of the set;
        code instructions to compute a motion mask for each frame of the set indicating whether each pixel associated with the at least one object in a respective bounding box in a respective frame is changed or unchanged compared to a corresponding pixel in a preceding frame of the set;
        code instructions to augment an image of the at least one object in each frame of a subset of frames selected from the set of frames to depict only the changed pixels within said respective bounding box and associated with the at least one object by cutting out the unchanged pixels associated with the at least one object; and code instructions to train at least one ML model, using the set of frames, to classify at least one activity of the at least one object based on identified moving portions of said at least one object according to said depicted changed pixels;

wherein the motion mask computation and pixel augmentation are performed to improve ML model training accuracy by emphasizing temporally changing object features.

11. The system of claim 10, wherein the at least one activity is a member of a group consisting of: an action conducted by the at least one object, an activity the at least one object is engaged in, an interaction of the at least one object with at least one another object, an event in which the at least one object participates, and a behavior of the at least one object.

12. The system of claim 10, wherein the bounding box of the at least one object is created using at least one visual analysis algorithm.

13. The system of claim 10, wherein the bounding box of the at least one object is defined manually by at least one annotator.

14. The system of claim 10, wherein each of the changed pixels is a member of a group consisting of: a moved pixel, a displaced pixel, and a transformed pixel.

15. The system of claim 10, wherein the changed and unchanged pixels in each frame compared to its preceding frame are identified using at least one motion detection algorithm.

16. The system of claim 10, wherein the subset of frames is selected from the set by computing a random value for each frame of the set using at least one random number module, and including the respective frame in the subset in case the random value computed for the respective frame does not exceed a predefined probability threshold.

17. The system of claim 10, wherein cutting out the unchanged pixels comprises blackening each unchanged pixel associated with the at least one object.

18. The system of claim 10, wherein the code further comprises code instructions to augment independently a plurality of subsets of frames for a plurality of objects, each of the plurality of subsets comprises images of a respective set of frames selected from the plurality of consecutive frames for a respective one of the plurality of objects.

19. The computer implemented method of claim 1, wherein:

said at least one object is a person, said identified moving portions of said at least one object are at least one body part of said person, participating in performing a dynamic activity by said person, and said augmented image depicts said at least one body part of said person and not depicting other body parts of said person, not participating in performing said dynamic activity.

20. The system of claim 10, wherein:

said at least one object is a person, said identified moving portions of said at least one object are at least one body part of said person, participating in performing a dynamic activity by said person, and said augmented image depicts said at least one body part of said person and not depicting other body parts of said person, not participating in performing said dynamic activity.

* * * * *